Figure 1:
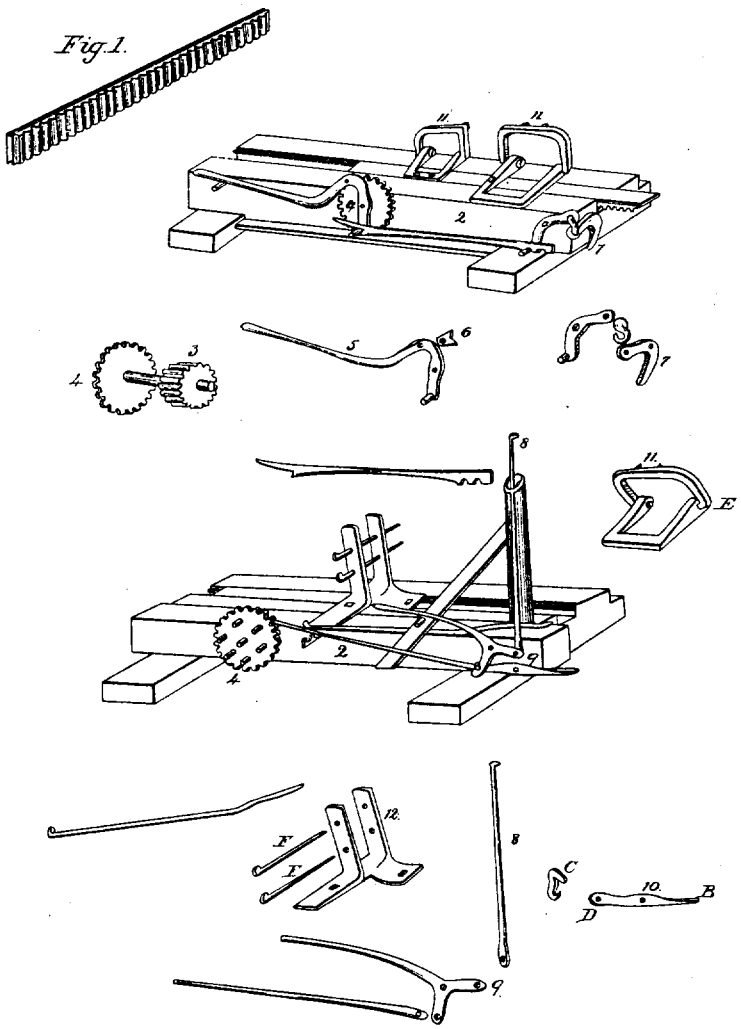

8514X

P. Bennet,

Saw-Mill Head-Block.

Patented Dec. 2, 1834.

A.M. PHOTO-LITHO. CO. N.Y. (OSBORNE'S PROCESS)

8514X

Dec 2, 1834

63

Phineas Bennet .. Ithaca, N. Y.

(Patented Decr 2. 1834. Re-[illegible] July. 25. 1836)

Letters Patent.

(The Schedule referred to in these Letters Patent and making part of the same containing a description in the words of the said Phineas Bennet himself of his improvement in the [illegible] Saw Mill Dog for which Letters Patent were granted, dated the 2nd day of December 1834, which Letters Patent are hereby cancelled

[illegible]

on account of a defective specification.

[illegible]

To all whom it may concern—

Be it known that I Phineas Bennet of the Town of Ithaca in the County of Tompkins and State of New York have made a new and useful improvement in Saw Mill Dogs which I denominate the Lever Saw Mill Dog: and that the following is a full and exact description thereof as amended by me, the description, a specification under which a patent was granted to me therefor dated December 2nd. 1834. having been found defective; and which patent I am therefore about to surrender to the United States to be cancelled and reissued; in accordance with the law in that case made and provided. In the accompanying drawing No. 1, is a rack which is best made of cast iron. For ordinary purposes it may be three and a half feet long, four inches wide and one inch thick. This and all other parts described whenever they are represented in the drawings either alone or in combination are designated by the same figures, or letters, this rack is to be tongued, grooved or rebated, at each edge, so that it may be made to slide readily in the head and tail blocks, of the carriage, between proper checks or guides, its plain side being upwards and on a level with the upper surfaces of the blocks, which blocks with their appendages are seen at No. 2. A ratchet wheel and a pinion which are used to give motion to the racks are shown separately both being attached to the same shaft, and are numbered 3 & 4. The ratchet wheel (4) is seen again in the two perspective views of the head and tail blocks, but the pinion, being under the rack is not seen; it is to be understood that the uppermost of these figures represents the tail block and the lowermost the head block. When the log is to be set, the ratchet wheel is to be turned by means of the lever No. 5. This lever works loosely on a pivot on the outer end of the shaft of the ratchet wheel and pinion and it has on it a pall, shown separately at No. 6 which pall takes into the teeth of the ratchet wheel and may be made to turn it in either direction, as it is capable of being reversed, if a firmer hold by the pall is thought necessary there may be a double row of teeth likewise teeth on the ratchet wheel the double pall or separate pall, being adapted to them. The lever may be moved by hand, or by connecting it with an elbow fastened on the head or tail block, as will be presently described. The log is to be held by means of dogs, made and having teeth formed in the usual way, as seen at No. 11. these dogs work on hinge joints or eyes at their lower 2214. 8514X ends, the lower part of the joint being firmly attached to the back, or upper side of the rack.

This apparatus may be rendered self setting if desired and the machinery for this purpose may be arranged in various ways, one of the most convenient of which ways I have represented in the drawing. There is on the tail block an elbow No. 7, connected by means of joints and a rod or lever with the ratchet wheel, as is distinctly shown in the drawing both as connected together, and also in separate parts; the outer end of the elbow No. 7, when the saw mill carriage runs back being made to strike a stationary pin, the log will be set and the extent of the setting may be readily regulated, as will be evident to any competent workman; on the head block No. 8 is an upright shaft capable of sliding up and down, the lower end of this is attached to the elbow joint as seen at No. 9 the top of the upright shaft No. 8, if struck by machinery attached to the saw gate at the instant the mill is set in motion after the carriage is run back, will effect the setting by the aid of the joints leading to the ratchet wheel. The machinery attached to the saw gate as used by me is a small wooden lever fastened at one end to a stationary post and at the other to the saw gate, & leaving a piece of wood projecting therefrom, so as to strike the before mentioned upright shaft. The lever No. 10, attached to the head block, may by the action of an inclined plane affixed to the floor, and acting on the outer end B, and leaving on its inner end D, a hook C, draw the setting apparatus back ready to be again acted upon as before.

What I claim as my invention is the arrangement for self setting as herein described, not intending however by this claim to limit myself to the precise manner of arranging the parts as herein set forth, but to vary the same as I may think proper, whilst I proceed substantially upon the principles herein fully made known.

Witnesses
Augustus Thenell
James Raymond

Phineas Bennett

Exd
W.H.

[illegible]

(1092 words)